United States Patent
Gude et al.

[15] 3,669,432
[45] June 13, 1972

[54] PROCESS FOR PRODUCING CEMENT FROM CEMENT SLURRY AND A PLANT FOR CARRYING OUT THE PROCESS

[72] Inventors: Klaus Erik Gude, Virum; Bjorn Lund, Kobenhavn F, both of Denmark

[73] Assignee: Aktieselskabet Niro Atomizer, Soborg, Denmark

[22] Filed: Sept. 4, 1970

[21] Appl. No.: 69,801

[30] Foreign Application Priority Data

Sept. 10, 1969 Denmark..............................4850/69

[52] U.S. Cl............................................263/32 R, 263/21 A
[51] Int. Cl.......................................................F27b 7/20
[58] Field of Search..............................263/21 A, 32 R, 53 R

[56] References Cited

UNITED STATES PATENTS

| | | | |
|---|---|---|---|
| 3,317,201 | 5/1967 | Muller et al. | 263/32 |
| 2,819,172 | 1/1958 | Trief | 263/53 X |

FOREIGN PATENTS OR APPLICATIONS

755,029  1/1954  Great Britain..........................263/32

Primary Examiner—John J. Camby
Attorney—Sughrue, Rothwell, Mion, Zinn & Macpeak

[57] ABSTRACT

Cement is produced from cement slurry which is spray-dried and preheated by means of exhaust gas from a kiln. The heat exchange between the exhaust gas from the kiln and the spray-dried material is controlled observing certain temperature limits, whereby an efficient elimination of harmful alkalies is obtained. Saving of investment is possible due to the fact that the kiln can be constructed shorter, or the capacity of an existing kiln can be increased.

7 Claims, 1 Drawing Figure

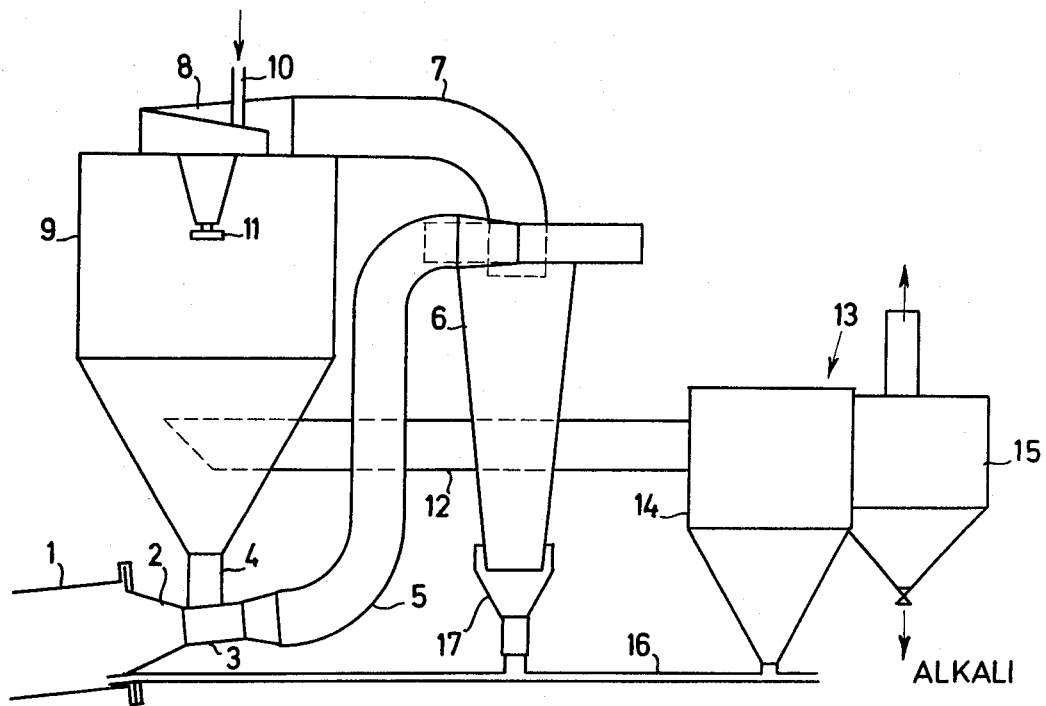

PROCESS FOR PRODUCING CEMENT FROM CEMENT SLURRY AND A PLANT FOR CARRYING OUT THE PROCESS

The present invention relates to a process for producing cement from cement slurry which is spray-dried and preheated by utilizing exhaust gas from a calcining and burning kiln, as well as a plant for carrying out the process.

The starting materials employed in cement production contain, to a greater or lesser degree, compounds which, in the burning of the material to cement, give rise to the formation of vapors containing alkali metals, normally, in the main potassium, in the form of oxides, chlorides or sulphates or as other volatile compounds. In conformity with the terminology used in literature on cement production, these relatively volatile alkali metal compounds are designated as "alkali" in the present specification.

The presence, in the raw materials, of alkali or of compounds, which in the heating process of the raw materials, particularly in the sintering process of same, form alkali vapors, pose serious problems which, on the one hand, are due to the fact that a high alkali content in the finished cement reduces the quality of same as a consequence of the fact that the alkalis may react with certain additives used in concrete production and as a consequence of the fact that the alkalis may affect the setting qualities of the cement and, on the other hand, that the alkalis give rise to difficulties in the cement burning process proper. For, in this process, a so-called alkali cycle will be produced due to the alkaline vapors produced in the calcining and burning zone of the burning kiln being conducted into the kiln with the hot gas, which gas is later on cooled off by contact with material that has not been burned yet during the preheating of same. Irrespective of whether the cement production is effected as a classical wet process, in which the slurry is introduced as such into a rotary kiln, or whether a plant for drying and preheating the slurry or raw meal is placed before the rotary kiln, an alkali condensation will take place with the cooling of the gas which, in the first case, may deposit itself in the form of a ring in the kiln and disturb its operation and, in the second case, may form flow-impeding deposits in the preheating plant, particularly in cyclones which may possibly be employed in same. In both cases, a serious upsetting of the balance necessary for carrying out the cement production, may arise. It furthermore happens in this case that alkali settles on the raw material which has not been sintered yet, which results in that, into the sintering zone, an additional amount of alkali to that contained in the raw material proper, is being introduced, whereby the problems mentioned are aggravated. Finally, it has to be stated that the said alkali cycle results in a poorer economy, in that calories for the evaporation of the alkali by the high temperature in the sintering zone are consumed, which calories are only liberated by the condensation at the lower temperature in the preheating process.

It consequently is particularly desirable to break this alkali cycle by a continuous removal of alkali from the system and various methods have been suggested for this purpose. It has thus been proposed in cement production by the dry process, to remove alkali from the system by omitting to utilize the total volume of hot gas from the kiln for preheating the raw meal, and instead of it, to allow a part of same to escape into the atmosphere immediately upon removal from the kiln. Naturally, this is an expensive method for alkali removal since the heat in the gas that is purged, goes to waste. Moreover, the amount of alkali which is allowed to escape into the atmosphere with the hot gases, could give rise to pollution of the environs of the cement factory. Moreover, in connection with the so-called Lepol kilns, in which the exhaust gas from a rotary kiln serves to preheat and dry the raw material, it is known to carry out a removal of alkaline dust from the gas subsequent to same having been used for preheating, but prior to it being employed for drying.

It has, furthermore, been proposed to solve the problems connected with the alkali by effecting the burning in two burning steps with separate firing, so that the calcining is carried out in the first burning step and the sintering in the second burning step, in which case only the gas issuing from the sintering contains alkali which is not recycled into the system, by employing special, less effective heat exchangers when utilizing the heat content of the gas for preheating the raw material. After the heat exchanging, the temperature of the gas has dropped to such an extent that it should be possible to remove its alkali content in the form of dust and the gas is thereupon utilized further for drying the raw material, for instance, for spray-drying the slurry. Finally, in certain cases, it is known to carry out a wet working up of the material accumulated in the dust filters for removing alkalis from same prior to the material being led back into the burning kiln.

However, it does hold good for these known methods that they result in significantly increased plant or operational costs and that they are not in all cases able to provide a sufficiently effective alkali removal.

The invention is based on the recognition that a particularly effective removal of alkali can be achieved involving low operational costs and in a plant requiring relatively modest plant expenditure by means of a process which, according to the invention, is characterized in that the exhaust gas issuing from the kiln is heat-exchanged with the spray-dried material to such an extent that the temperature of the gas does not drop below approximately 750° C, while the spray-dried material is heated to at least 550° C, and in that the gas is subsequently used as drying gas in the spray drying, whereby it is cooled further to not above 300° C.

Be means of this process, a very effective utilization of the heat present in the exhaust gas from the kiln is achieved, while, at the same time, removing the alkali content of the gas.

As a consequence of the temperatures selected in the heat exchanging, the preheated material issuing from the heat exchanger will not to any significant degree have received alkalis from the gas since, depending upon the construction of the heat exchanger either no deposition of alkali on the material will occur at all, or, if such a deposition does take place, it is going to evaporate again when the temperature of the material rises in the heat exchanger. The main part of the amount of alkali present in the exhaust gas of the kiln will thus be conducted further with the gas into the spray drying apparatus. In this, the alkaline gas having a temperature of at least 750° C, contacts the atomized aqueous slurry. By this means, an intensive evaporation from the atomized particles will take place and, at the same time, as a consequence thereof, a cooling off of the gas, by means of which the alkali is separated. The cooling of the gas occurs quite close to the wet particles, but on account of the strong evaporation from same, the alkali is not deposited at all, or else only to a very slight degree, on the particles of the atomized slurry, but remains in the gas in the form of very fine particles. Since the gas is cooled to a temperature of 300° C or lower, these particles are present as a fine dust which is not tacky and which consequently does not tend to agglomerate or settle on the walls of the atomizer. These fine alkaline particles are subsequently led away from the spray drying apparatus with the exhaust gas, possibly together with a minor quantity of fine particles formed by the atomization of the raw meal, to a suitable particle separation plant.

A preferred embodiment of the process is, according to the invention, characterized in that the heat exchanging is effected by dispersing the dried material in a gas stream and by letting it be transported into the heat exchanger, whereupon it is separated by means of a cyclone, whereby such volumes of gas and quantities of material and such temperatures are employed that the temperature of the exhaust gas from the cyclone is at least 800°C, while the material is heated to at least 600°C, and the gas is cooled to not above 200°C during the spray drying. By means of this embodiment, an effective heat exchanging by the use of a relatively cheap and reliable apparatus is rendered possible, while the stated temperatures ensure that any possible alkali which, by this cocurrent heat exchanging, may settle on the relatively cold material when same is brought into contact with the very hot gas from the kiln, will again vaporize prior to the material being taken out of the cyclone. In this embodiment, the maximum temperature employed of the gas issuing from the spray drying apparatus, ensures, even under extreme conditions, that no alkali agglomeration takes place in the spray drier.

Furthermore, the invention relates to a plant for carrying out the process, which plant is characterized in that it comprises a heat exchanger of the kind which is able to equalize temperature differences between gas and powdered material, as well as a spray drier, whereby the heat exchanger is provided with a gas feed opening for connection to the gas discharge aperture of a calcining and burning kiln, a gas discharge aperture which is connected to the gas feed aperture of the spray drying apparatus, and a supply aperture for powdered material which is connected to the discharge aperture of the spray drying apparatus for same.

A preferred embodiment of this plant is, according to the invention, characterized in that the heat exchanger has a gas feed component which comprises an ejector having one or several supply apertures for powdered material in the throat of the ejector, a pipe connected to the discharge aperture of the ejector as well as a cyclone, in which the part of the pipe opposite to the ejector terminates. This embodiment of the plant is particularly suited for carrying out the preferred embodiment of the process described above, in that it, with a slight loss in pressure, renders an immediate and effective dispersal of the spray-dried material in the preheating air possible, as well as the regenerating of it from same.

The spray drying apparatus which is employed in the plant according to the invention is preferably equipped with a rotating atomizer, since such an atomizer renders the achieving of contact between the very hot alkali containing drying air and the aqueous slurry particles possible, which determines the separation of the alkali in the desired manner in the form of fine particles which are carried by the gas. As the slurry has a strongly abrasive effect on the atomizer wheel, it is expedient to employ a wheel which is fitted with wear-resistant interchangeable inserts.

In the following, the invention will be explained in greater detail with reference to the drawing which schematically shows the preferred embodiment of the plant according to the invention as characterized above, as well as some of the units to which the plant, when operating, is directly connected.

In the drawing, a feed end 1 of a rotary kiln is shown which is of a length that is suited to the production of cement according to the dry process. Gases issue from this end of the kiln at a temperature of the order of magnitude of 1000–1100° C. To the end of the kiln, an ejector 2 with a throat 3 is connected. In the throat 3, there are one or several apertures for the introduction of spray-dried slurry via the supply pipe 4. The discharge aperture of the ejector is connected to a pipe 5 which, in the embodiment shown, has a perpendicular part. When spray-dried slurry is introduced into the throat 3 via the pipe 4, it is dispersed in the hot gas streaming from the kiln and conducted with same via the pipe 5, concurrently with a heat exchanging taking place between the hot gas and the relatively cold material originating from the spray drying of the slurry. A particularly effective heat exchanging is obtained when the pipe, as shown, is provided with a perpendicular part, however, the pipe may also run horizontally.

The pipe 5 terminates in a cyclone 6, in which the preheated solid material is separated from the gas. The latter is conducted from the cyclone via a pipe 7 to a ceiling air distributor 8 in a spray drying apparatus 9. Moreover, the spray drying apparatus has a supply line 10 for slurry and a rotating atomizer 11 for atomizing same.

When the gas from the pipe 7, at a temperature of at least 550° C, via the ceiling air distributor 8, passes down into the spray drying apparatus 9, it is brought into contact with the slurry introduced via the line 10 and atomized by the atomizer 11, which results in the appearance of a spray-dried material having a temperature of the order of magnitude of 100–150° C, which material flows down into the pipe 4 from where it is introduced in the ejector 2 as described. The gas, which hereby is cooled down to below 300° C, preferably to 170–200° C, contains the alkali in the form of dispersed particles, and is led, via a line 12, to a dust separating plant 13 which may possibly be constituted of electrostatic filters.

In the embodiment shown in the drawing, the plant 13 consists of two integral units 14 and 15, of which the unit 15 acts selectively so that only coarser particles originating from the spray drying of the slurry are separated in this unit, while the fine particles and with them the principal amount of alkali in the gas proceed to the unit 15, in which they are separated and can be removed, for example, for fertilizing purposes. From the unit 15, the gas is conducted into the atmosphere. It is possible to employ even lower temperatures than those stated for the discharge gas from the drier, if no electrostatic filters are used.

The coarser particles separated in the unit 14 are conducted via a pipe 16, through which, by pneumatic means, they are transported to the feed end of the kiln 1. The preheated material separated in the cyclone 6 is likewise conducted pneumatically to the feed end of the kiln via the pipe 16, into which it is introduced through a gate 17.

Besides the special advantage which the plant entails as a consequence of its capacity for effective alkali removal, it possesses several advantages as compared to the classical wet process, in which the aqueous slurry is introduced directly into a rotary kiln. The plant according to the invention renders the drying and preheating section of the kiln superfluous, whereby the rotary kiln for a given capacity can be constructed considerably shorter, for which reason the plant results in a considerable saving of investment. Moreover, the plant is, of course, well suited for increasing the capacity of an existing kiln. The plant according to the invention entails, furthermore, easier operating conditions since it provides the possibility of a faster control of operation conditions than does the long rotary kiln which is very slow to heat up.

EXAMPLE

Cement slurry is worked up from sand, limestone and clay for obtaining a product which, after drying at 105° C in a laboratory oven, has the composition detailed below. By burning this slurry to cement clinker subsequent to spray drying and preheating in conformity with the process according to the invention, cement clinker having the composition given in detail below is obtained.

|  |  | Dried Slurry | Cement Clinker |
|---|---|---|---|
| $SiO_2$ | % | 13.2 | 21.3 |
| $Al_2O_3$ | % | 4.3 | 6.6 |
| $Fe_2O_3$ | % | 1.7 | 3.7 |
| $CaO$ | % | 42.5 | 64.6 |
| $MgO$ | % | 1.5 | 1.7 |
| $SO_3$ | % | 0.8 | 1.0 |
| $K_2+Na_2O$ | % | 0.84 | 0.32 |

Loss through calcination 35.2.

From the above-quoted results it appears that by means of the process an effective alkali removal takes place since the alkali content in the cement clinker amounts to only approximately half of the value which is normally tolerated in cement which is poor in alkali.

What we claim is:

1. A process for producing cement and eliminating harmful alkalies from cement slurry comprising the steps of:
  a. removing exhaust gas from a calcining and burning kiln;
  b. preheating a spray-dried slurry by mixing said exhaust gas with said spray-dried slurry in a heat exchanger such that the temperature of said gas does not drop below 750° C and the temperature of said spray-dried slurry is raised to at least 550° C;

c. separating said gas from said preheated spray-dried slurry;
d. placing said preheated spray-dried slurry into said kiln; and
e producing said spray-dried slurry by spray-drying a wet slurry by mixing said separated gas with said wet slurry wherein said gas which contains harmful alkalies is cooled to a temperature below 300° C and is exhausted.

2. The process as set forth in claim 1 wherein said gas and said spray-dried slurry are separated in a cyclone separator and wherein the exhaust gas from said cyclone separator is at least 800° C and said preheated spray-dried slurry is at least 600° C.

3. The process as set forth in claim 2 wherein the temperature of said gas after the spray-drying is below 200° C.

4. An apparatus for producing cement and removing harmful alkalies from cement slurry comprising:
a. a kiln;
b. first exhaust means for removing exhaust gas from said kiln;
c. heat exchanger means coupled to said first exhaust gas means for mixing said exhaust gas with a spray-dried slurry and for preheating said spray-dried slurry by causing a heat exchange between said exhaust gas and said slurry wherein said heat exchanger means is of the type for equalizing temperatures between a gas and a powdered material;
d. separator means coupled to said heat exchanger means for separating said preheated spray-dried slurry and said exhaust gas;
e. first means coupled to said separator means for conducting said preheated, spray-dried slurry into said kiln;
f. spray-drying means for spray-drying a wet slurry by mixing said wet slurry with said exhaust gas separated by said separator means;
g. second means coupled between said separator means and said spray-drying means for conducting said separated gas from said separator means to said spray-drying means;
h. third means coupled between said spray-drying means and said heat exchanger means for conducting said spray-dried slurry from said spray-drying means to said heat exchanger means; and
i. second exhaust means coupled to said spray-drying means for removing said exhaust gas which contains the harmful alkalies from said spray-drying means after said wet slurry has been spray-dried.

5. The apparatus as set forth in claim 4 wherein said heat exchanger means comprises:
a. an ejector coupled to said first exhaust means and said third means for receiving and mixing said exhaust gas and said spray-dried slurry; and
b. pipe means in which said heat exchange takes place.

6. The apparatus as set forth in claim 5 wherein said separator includes a cyclone means.

7. The apparatus as set forth in claim 4 wherein said spray-drying means includes a rotating atomizer.

* * * * *